No. 710,375. Patented Sept. 30, 1902.
M. S. SHOTWELL.
WHEEL.
(Application filed Aug. 5, 1902.)
(No Model.)
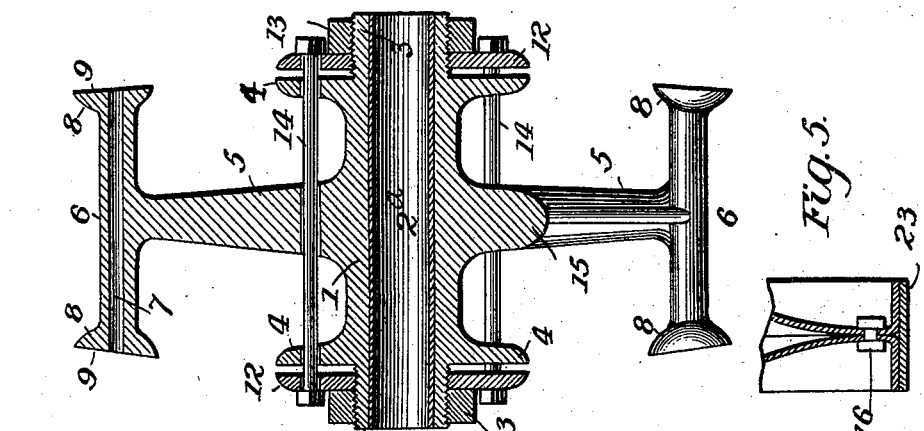
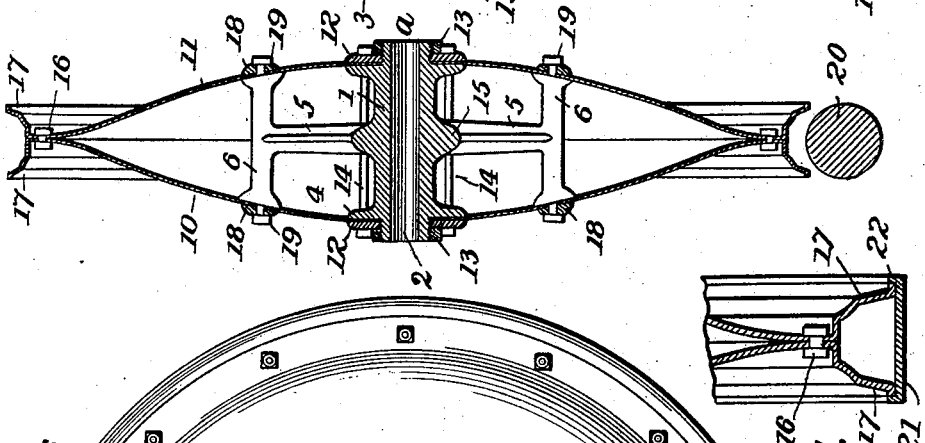
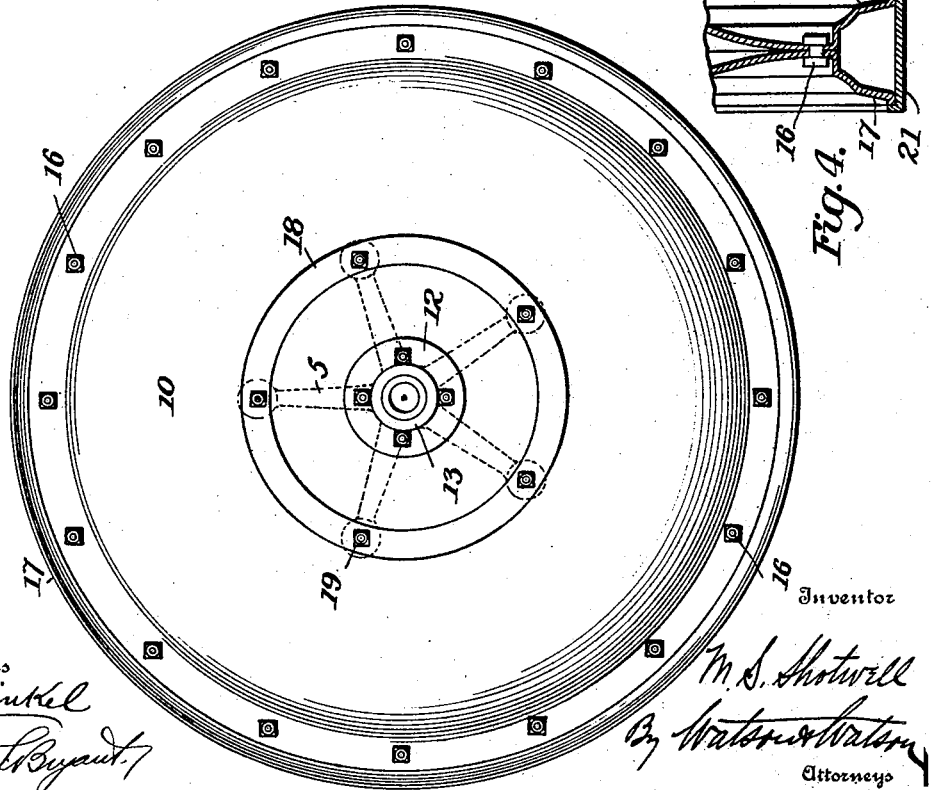
Witnesses
Inventor
M. S. Shotwell
By Watson & Watson
Attorneys

UNITED STATES PATENT OFFICE.

MELANCTHON S. SHOTWELL, OF HARRISBURG, PENNSYLVANIA.

WHEEL.

SPECIFICATION forming part of Letters Patent No. 710,375, dated September 30, 1902.

Application filed August 5, 1902. Serial No. 118,500. (No model.)

*To all whom it may concern:*

Be it known that I, MELANCTHON S. SHOTWELL, a citizen of the United States, residing at Harrisburg, in the county of Dauphin, State of Pennsylvania, have invented certain new and useful Improvements in Wheels, of which the following is a specification.

The purpose of this invention is to provide a metal wheel or pulley comparatively light in weight and very rigid laterally and in the plane of its revolution.

In the accompanying drawings, Figure 1 is a side view of a complete wheel. Fig. 2 is a central transverse section through the same.
Fig. 3 is a longitudinal sectional view through the hub. Fig. 4 is a detail view showing the application of a flattened tire to the wheel illustrated in Figs. 1 and 2, and Fig. 5 is a detail view showing the rim of a wheel flattened to accommodate a flat tire.

Referring to Figs. 1 to 3, inclusive, of the drawings, *a* indicates the wheel-hub, comprising a central cylindrical portion 1, having the usual bore 2, through which the axle or shaft extends and having its end portions 3 exteriorly threaded and flanges or shoulders 4 adjacent to said threaded portions. A suitable hardened bushing 2ª or other form of bearing may be arranged within the bore of the hub. Connected to the hub and preferably integral therewith are arms or spokes 5, which radiate from the central portion of the hub midway between the flanges 4. Each spoke is provided with a cross-arm 6 at its outer end, extending parallel with the body of the hub. These arms are bored longitudinally, as indicated by the numeral 7, thus constituting sleeves or thimbles, and the ends 8 of the arms are enlarged and beveled on their outer faces 9, as shown, forming clamping or bearing surfaces thereon.

The web of the wheel consists of a pair of disks 10 and 11, similar in construction and provided with central openings which fit around the threaded ends of the hub, the parts of said disks adjacent to the openings lying against the flanges or shoulders 4. These disks are secured to the hub by threaded washers 12 and threaded rings or nuts 13, which clamp and lock the disks against the shoulders, and also by several rods or bolts 14, which extend through the washers 12, flanges 4, and a central boss 15 upon the hub. The disks, as shown, are dished at the center, and when in position, the convex surfaces of the disks being outermost, the web of the wheel is lenticular in form. The disks are united near their peripheries by a circular series of bolts or rivets 16, and the rim portions 17 of the disks, beyond the rivets, are suitably formed to receive a belt or a tire. The disks are braced laterally by the cross-arms 6, against the ends of which they bear and against which they are clamped by clamping-rings 18 or suitable washers arranged upon the outer sides of the disks and held in place by bolts 19, passed through the disks and the cross-arms or thimbles.

The spokes and cross-arms, in addition to lending great lateral rigidity to the wheel, connect the disks firmly with the hub and prevent the rotation of the disks upon the hub. The bolts or rods 14 also serve to prevent rotation of the disks upon the hub.

The rim portions of the disks may be variously formed. In Figs. 1 and 2, for instance, the rim is flared to receive a round tire or belt 20. In Fig. 4 a flattened tire 21, having side flanges 22, is arranged upon a rim similar to that shown in Figs. 1 and 2, and in Fig. 5 the rim portion of the wheel is flat, and a flat tire 23 is secured thereon. The hub, spokes, and cross-arms are preferably made in one piece, although these parts may of course be made separately and afterward connected together. The cross-arms may also obviously be solid instead of being bored through to form sleeves or thimbles.

Having described my invention, what I claim, and desire to secure by Letters Patent, is—

1. A wheel comprising a pair of disks connected together at or near their peripheries, a hub centrally arranged between said disks, said hub having spokes projecting therefrom between the disks and cross-arms upon said spokes, and means for attaching the disks to the ends of said arms.

2. A wheel comprising a pair of disks connected together at or near their peripheries, a hub centrally arranged between said disks, said hub having spokes projecting therefrom between the disks and cross-arms upon said spokes, said arms having enlarged ends, and means for attaching the disks to the ends of said arms.

3. A wheel comprising a pair of disks connected together at or near their peripheries, a hub centrally arranged between said disks, said hub having spokes projecting therefrom between the disks and tubular cross-arms or thimbles transversely arranged upon said spokes, and bolts passing through said disks and cross-arms and securing the disks to the cross-arms.

4. A wheel comprising a pair of disks connected together at or near their peripheries, a hub centrally arranged between said disks, said hub having spokes projecting therefrom between the disks and tubular cross-arms or thimbles transversely arranged upon said spokes and having enlarged ends, and bolts passing through said disks and cross-arms and securing the disks to the cross-arms.

5. A wheel comprising a hub having exteriorly-threaded ends, flanges near said ends, spokes radiating from the hub and cross-arms upon said spokes, in combination with a pair of disks connected together at or near their peripheries and having central openings fitting over the ends of the hubs, devices upon the threaded ends of the hub for clamping the disks against the flanges, and means for clamping the disks against the ends of the cross-arms.

6. A wheel comprising a hub having exteriorly-threaded ends, flanges near said ends, spokes radiating from the hub and cross-arms upon said spokes, in combination with a pair of disks connected together at or near their peripheries and having central openings fitting over the ends of the hub, threaded washers upon the ends of the hub for clamping the disks against the flanges, bolts passing through said washers, disks and flanges, and means for clamping the disks against the ends of the cross-arms.

7. A wheel comprising a pair of disks connected together at or near their peripheries, a hub centrally arranged between said disks, said hub having spokes projecting therefrom between the disks and cross-arms upon said spokes, clamping-rings upon the outer sides of the disks and means for securing said rings to the cross-arms.

In testimony whereof I affix my signature in presence of two witnesses.

MELANCTHON S. SHOTWELL.

Witnesses:
    THOMAS E. TWIST,
    WILLIAM G. MURDOCK.